United States Patent [19]

Fulwiler

[11] 3,763,330

[45] Oct. 2, 1973

[54] AUXILIARY DEVICE FOR A CASSETTE TAPE RECORDER INCLUDING A PLUG CONFORMED AS A CASSETTE FOR INTERCONNECTION

[75] Inventor: Stanley S. Fulwiler, Hilton, N.Y.

[73] Assignee: Tapecon, Inc., Rochester, N.Y.

[22] Filed: June 28, 1971

[21] Appl. No.: 157,330

[52] U.S. Cl. .... 179/100.2 Z, 242/55.19 A, 274/4 G
[51] Int. Cl. ...................... G11b 23/04, G11b 25/10
[58] Field of Search ........... 179/100.2 Z, 100.2 MD, 179/100.1 A, 100.11; 274/4 B, 4 C, 4 E, 4 G; 242/55.19 A

[56] References Cited

UNITED STATES PATENTS

| | | | |
|---|---|---|---|
| 3,700,826 | 10/1972 | O'Neal | 179/100.2 Z |
| 3,531,127 | 9/1970 | Harper | 179/100.2 Z |
| 3,632,894 | 1/1972 | Bretschneider | 179/100.2 Z |
| 3,598,927 | 8/1971 | Becker et al. | 179/100.2 MD |
| 3,521,010 | 7/1970 | Sato | 179/100.2 Z |

*Primary Examiner*—Bernard Konick
*Assistant Examiner*—Alfred H. Eddleman
*Attorney*—George W. Shaw et al.

[57] ABSTRACT

An auxiliary device for a cassette tape recorder has an auxiliary magnetic head and an independent drive for moving a magnetic record medium past the head. The auxiliary is connected to a cassette tape recorder by a plug having a transducer in electrical circuit with the auxiliary magnetic head. The plug is shaped to fit into the cassette slot of the recorder so that the transducer engages the magnetic head of the recorder to communicate audio signals between the recorder magnetic head and the auxiliary magnetic head. The auxiliary device then allows play and record in a magnetic medium different from the cassette medium of the recorder.

3 Claims, 5 Drawing Figures

INVENTOR.
STANLEY S. FULWILER
BY Cumpston, Shaw and Stephens
ATTORNEYS

INVENTOR.
STANLEY S. FULWILER
BY Cumpston, Shaw and Stephens
ATTORNEYS

AUXILIARY DEVICE FOR A CASSETTE TAPE RECORDER INCLUDING A PLUG CONFORMED AS A CASSETTE FOR INTERCONNECTION

THE INVENTIVE IMPROVEMENT

Cassette tape recorders have become very popular, and several sizes and shapes of cassettes have become standard in the art. Cassette tape recorders are relatively simple and generally independent of other equipment.

The invention involves recognition of the advantages of an auxiliary device as a companion to a cassette tape recorder to operate in a different medium. For example, the auxiliary device might use a different type of cassette tape, a reel-to-reel tape, a linear tape on a planar card, or otherwise differ from the cassette medium of the recorder. The invention recognizes a simple and expedient way to connect such an auxiliary device to a cassette tape recorder to effect audio communication between the recorder and the auxiliary.

The invention also aims at economy, efficiency, reliability, versatility, and compatibility with existing equipment in enlarging the capacity of cassette tape recorders through use of auxiliary devices.

SUMMARY OF THE INVENTION

The inventive auxiliary device accompanies a cassette tape recorder that has a cassette slot and a magnetic head. The auxiliary device includes an auxiliary magnetic head and means for driving a magnetic record medium past the auxiliary magnetic head. The auxiliary also includes a plug and a transducer arranged in the plug in electrical circuit with the auxiliary magnetic head. The plug is shaped to fit into the cassette slot of the recorder to dispose the transducer in the region of the recorder magnetic head to communicate audio signals between the recorder magnetic head and the auxiliary magnetic head. This allows the auxiliary device to record and play through the basic recorder in a magnetic medium different from the one used by the recorder.

DRAWINGS

DETAILED DESCRIPTION

Figures 1, 2:
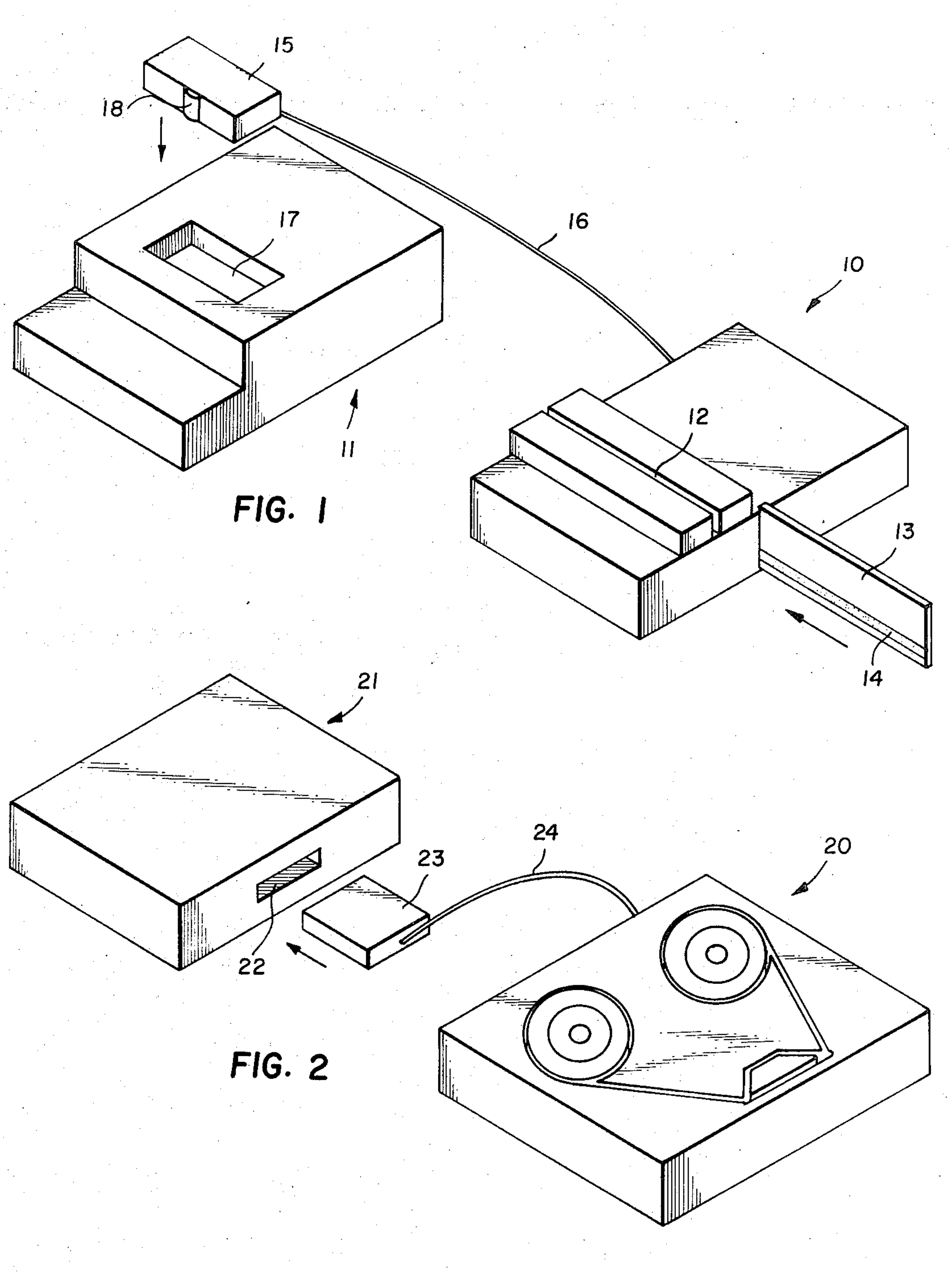
FIGS. 1 and 2 are perspective, schematic views of preferred auxiliary and cassette recorder combinations.

Auxiliary 10 of FIG. 1 enlarges the capacity of cassette tape recorder 11 by providing a different drive and recording medium. Auxiliary 10 has a slot 12 for receiving a planar card 13 having a magnetic strip 14 and includes means for driving card 13 through slot 12 to play or record on strip 14. Auxiliary 10 is connected to recorder 11 through a plug 15 connected to auxiliary 10 by an electric cord 16. Plug 15 preferably has the same shape as one of the cassettes usable in recorder 11 so that plug 15 can be removably snapped into cassette slot 17. Plug 15 has a transducer 18 that preferably engages the magnetic head of recorder 11 for establishing audio communication between auxiliary 10 and recorder 11. The details of this are explained more fully below.

Auxiliary device 20 of FIG. 2 accompanies cassette tape recorder 21 which uses a different form of standard cassette. Auxiliary 20 is connected to recorder 21 by a plug 23 preferably shaped to snap into cassette slot 22 and connected to auxiliary 20 by an electric cord 24. Plug 23 also has a transducer disposed near the recording head of recorder 21 for communicating audio signals between auxiliary 20 and recorder 21. Auxiliary device 20 has a reel-to-reel tape drive.

In addition to the linear and reel-to-reel drives respectively shown for auxiliaries 10 and 20, auxiliaries can also have disk, belt, drum, or other drives, including different sized cassettes and tapes both stereo and monoral, single and multichannel. Plugs 15 and 23 preferably have the same shape as the cassettes intended for recorders 11 and 21, but need not be identical to the cassettes so long as they can snap-fit into the cassette slots of such recorders. A jack connection can be provided in cords 16 and 24 for attaching different plugs to auxiliary devices 10 and 20 for plugging them into different cassette recorders. Plugs 15 and 23 are preferably made in all the common standard sizes for fitting cassette tape recorders currently available. Hence, auxiliaries made according to the invention can use any available drive for a magnetic medium and can be plugged into any available cassette tape recorder to make any combination of drives and magnetic media cooperable.

Figure 3:
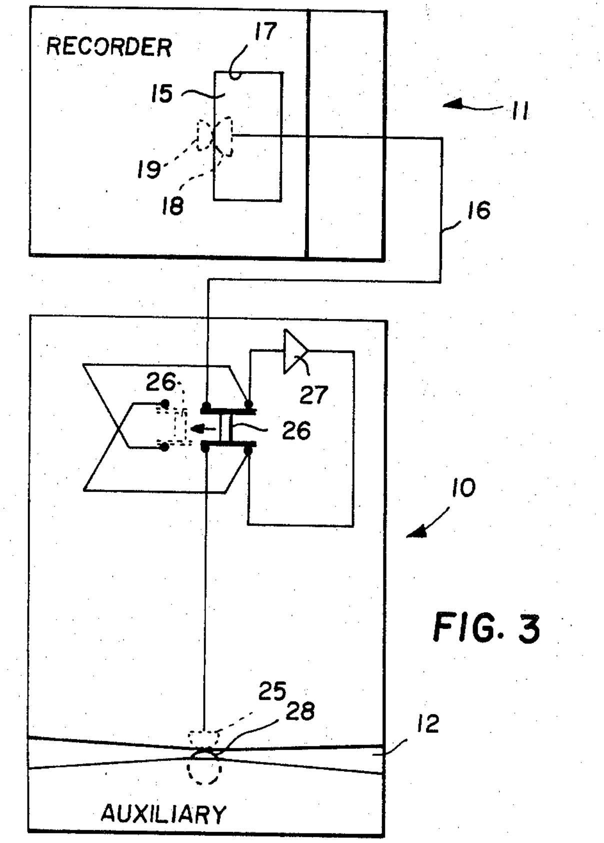
FIG. 3 is a schematic diagram of the preferred connection between an auxiliary device and a cassette recorder.

The operation of the inventive auxiliary device is best shown in FIG. 3, using auxiliary 10 as an example. The transducer 18 of plug 15 preferably engages the magnetic head 19 of recorder 11 as disposed in cassette slot 17. Transducer 18 is preferably a magnetic head that can send or receive audio signals to or from magnetic device head 19 through such mutual engagement.

Auxiliary 10 includes an auxiliary magnetic head 25 arranged in slot 12 for playing and recording on the linear magnetic strip 14 carried by card 13, as shown in FIG. 1. Auxiliary 10 has a drive wheel 28 arranged in slot 22 opposite magnetic head 25 for driving cards 13 through slot 12 with magnetic strips 14 in engagement with head 25.

Auxiliary magnetic head 25 is in electrical circuit with transducer 18 through switch 26, booster amplifier 27, and electric cord 16. Switch 26 controls the direction or mode of booster amplifier 27 to set auxiliary 10 for either record or play. When switch 26 is moved to the broken-line position, the direction of booster amplifier 27 is reversed. Preferably automatic switching means (not shown) are used to control switch 26, but manual switching can be used.

In operating to record a message on card 13, recorder 11 and switch are each set in the record mode and card 13 is driven through slot 12. The signal to be recorded is applied to magnetic head of recorder 11 which energizes transducer 18 to produce an audio signal that is fed through cord 16, switch 26, and booster amplifier 27, and is applied to auxiliary magnetic head 25 for recording the signal on magnetic strip 14 on card 13. To operate auxiliary 10 for playing back a message on card 13, recorder 11 and switch 26 are each set in the play mode and card 13 is driven through slot 12. The recorded signals on strip 14 are picked up by magnetic head 25 and fed through switch 26, booster amplifier 27, and cord 16 to energize transducer 18 which transmits the signals directly to magnetic head 19 of recorder 11. Magnetic head 19 feeds the signal through the circuitry of recorder 11 for an audio output in a generally known way.

The connection of auxiliary device 10 to recorder 11 through plug 15 is an audio connection that eliminates problems of variations in tape speeds, tape sizes, drive mechanisms, numbers of channels, and stereo or mono output. These differences are all reduced to an audio signal that is communicated between the devices through transducer 18 so that auxiliary 10 is automatically compatible with recorder 11. Also, auxiliary 10, with its standard cassette shaped plug 15, can be plugged into any one of a multitude of recorders 11 without requiring any adjustment or adaptation. This means that the relatively simple, linear card playing auxiliary 10 can be purchased with assurance that it will fit existing cassette tape recorder equipment regardless of differences in manufacture and operation. Also, by substituting different plugs 15, auxiliary 10 can be made to operate successfully with several different types of cassette tape recorders.

Figure 4:
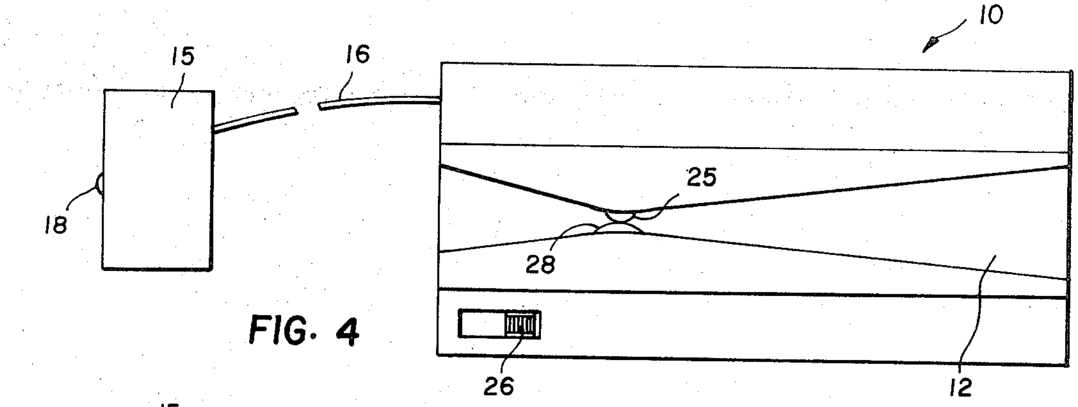
FIG. 4 is a partially schematic plan view of a preferred embodiment of the inventive auxiliary device.
Figure 5:
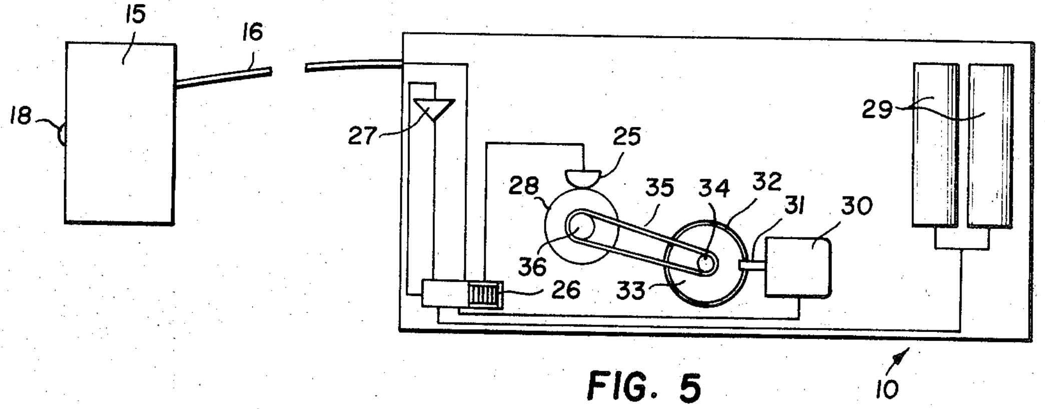
FIG. 5 is a partially schematic view of the internal mechanisms of the auxiliary device of FIG. 4.

FIGS. 4 and 5 schematically show a drive mechanism for the inventive auxiliary device, using the card drive of auxiliary 10 as an example.

FIG. 4 shows slot 12 having magnetic head 25 and drive wheel 28 for moving the card linearly through auxiliary 10. Switch 26 controls the record or play mode of auxiliary 10 which is plugged into a cassette tape recorder by plug 15 connected to auxiliary 10 by cord 16 and carrying transducer 18 as previously described.

FIG. 5 schematically shows the internal working mechanisms of auxiliary 10. Switch 26 controls the direction of booster amplifier 27 and the application of power from batteries 29 to drive motor 30. Motor 30 turns a shaft 31 that engages an upstanding rim 32 of a disk 33 to rotate disk 33 at a much slower RPM than shaft 31. A pulley 34 coaxial with disk 33 drives a belt 35 to pulley 36 which turns drive wheel 28 in engagement with magnetic head 25. Wheel 28 advances a card against magnetic head 25 for operating auxiliary 10 as described above.

Those skilled in the art will understand the many drive mechanisms available for magnetic media of different types including linear strips, belts, tapes of different sizes, disks, drums, etc., and will appreciate how any such auxiliary devices can be plugged into a cassette tape recorder for operation according to the invention. Many variations are available in amplification, drives, plug connections, and switching, all as generally known in the art once the inventive suggestion is made.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the variations of the invention possible under different circumstances.

I claim:

1. An auxiliary device connectable to any different style of cassette tape recorder using a standard cassette in a cassette slot and having a magnetic head, an amplifier, a speaker, and microphone, said auxiliary device comprising:

a. a housing independently and movably separated from any one of said cassette tape recorders;
b. an auxiliary magnetic head in said housing;
c. drive means in said housing for driving a magnetic strip on a planar card past said auxiliary magnetic head;
d. means for powering said drive means independently of said cassette tape recorder;
e. a plug;
f. electric conductor means for flexibly connecting said plug to said housing;
g. an electromagnetic transducer in said plug in electrical circuit with said auxiliary magnetic head;
h. booster amplifier means in said housing in said electrical circuit with said transducer and said auxiliary magnetic head;
i. switch means in said housing for switching said booster amplifier between record and play modes;
j. said plug having all its dimensions conformed to said standard cassette to fit removably into any one of said cassette slots to dispose said transducer adjacent said recorder magnetic head; and
k. said transducer, electric conductor, booster, amplifier switch means and auxiliary magnetic head being arranged for using audio signals from said microphone and amplifier of said cassette tape recorder to record on said card and for sending audio signals from said card to said cassette tape recorder to play back through said speaker.

2. The device of claim 1 wherein said drive means advances said magnetic strip at a substantially slower rate than the drive rate of tape in said standard cassette.

3. The device of claim 2 wherein said drive means includes a speed reducer wheel having an upstanding rim engaged by a driven capstan.

* * * * *